UNITED STATES PATENT OFFICE.

HERMAN A. BRASSERT, OF BRADDOCK, PENNSYLVANIA.

METHOD OF PURIFYING IRON.

1,032,654.  Specification of Letters Patent.  Patented July 16, 1912.

No Drawing.   Application filed November 15, 1904.  Serial No. 232,896.

*To all whom it may concern:*

Be it known that I, HERMAN A. BRASSERT, a subject of the King of Great Britain and Ireland, residing at Braddock, in the county of Allegheny and State of Pennsylvania, have invented a new and useful Improvement in Methods of Purifying Iron, of which the following is a specification.

This invention relates to the manufacture of iron.

The growing scarcity of low phosphorous iron ores in this country is becoming a serious obstacle to the manufacture of steel by the acid Bessemer process, yet the ores do not contain sufficient phosphorus to warrant the introduction of the basic Bessemer process.

An object of this invention is to provide a method whereby iron in large quantities may be purified more thoroughly, more rapidly and at less cost than by any methods known to me.

A further object of this invention has been to provide a method whereby iron low in phosphorus may be readily manufactured from high phosphorous ores, and an iron of any required analysis, suitable for use with the acid Bessemer process of steel manufacture, and for use in the manufacture of high grade crucible steel may be produced.

A further object of this invention has been to provide a method for purifying the molten iron as it is tapped from the blast furnace, making use of the high initial heat of the iron and saving the cost of intermediate transportation and handling.

A further object of this invention has been to provide a method for purifying iron, utilizing the equipment of the blast furnace, such as hot blast, casting apparatus and blast furnace gas.

A still further object of this invention has been to utilize the liquid blast furnace cinder as it flows from the tapping hole of the furnace with the cast of iron for purifying the iron.

These and other objects I attain by means of the method hereinafter described.

In carrying out this invention I preferably proceed in the following manner:— The whole or part of the cast from a blast furnace is collected in a receptacle situated as closely as possible to the tapping hole of the blast furnace, whereby the initial heat of the molten metal is substantially the same as the heat of the metal in the hearth of the blast furnace and the metal collected is in a super-molten condition. The receptacle is preferably a shallow circular one provided with a number of twyers ranged around it and positioned so as to direct blasts of air downwardly onto the surface of the metal contained therein in such a manner that a rotary or whirling motion is given to the metal of the bath. If desirable all or part of the liquid blast furnace cinder flowing from the tapping hole of the furnace may be allowed to pass with the iron into the receptacle, or, if desired, all or part of the cinder may be replaced by other fluxes, such as limestone, which will either be placed in the receptacle before or after the iron has been collected. Either before or after the iron has been collected in the receptacle, suitable oxidizing agents, such as iron ore, manganese ore, scale or steel cinders, in suitable amounts are introduced to react on the iron, whereby the silicon, manganese, phosphorus and sulfur are partially or wholly removed. In order to assist this reaction the air blast is turned on. The rotary motion given to the bath by this blast insures that all of the metal comes in close contact with the oxids and fluxes and the oxygen of the blast. At the same time, a strongly oxidizing atmosphere is maintained at the contact point of slag and metal, thus greatly facilitating and accelerating the reaction. The acceleration of the reaction is very important as the loss of heat through radiation is considerable, and only a limited amount of heat is available from the oxidation of the elements. By means of the blast accelerating the reaction, more heat is accumulated in a given time, and by the blast beating down onto the metal bath, the zone of greatest heat is always kept in close proximity to the bath. By regulating the air blast the heat of the bath can be varied at pleasure. This is of extreme importance when dephosphorizing. The phosphorus will be oxidized and pass into the cinder more readily at a low temperature, yet it will not enter the slag unless the same has a certain degree of fluidity, and with the air blast this narrow working limit of temperature can be easily maintained.

In most cases it is not desired to decrease the carbon contents of the iron, therefore the bath is tapped as soon as the other elements have been removed to the desired extent.

If it is desired to remove sulfur by this process, such fluxes can be added as will form a slag of such composition as will react upon it.

This process can be advantageously carried on in a so called fore-hearth connected to the blast furnace in which the molten iron is collected, but in which no coke is present. The twyers for the air blast will be positioned around the fore-hearth, as above described, and the oxids and fluxes added in the same manner. The purified iron may be tapped either into chills, or conveyed to a pig machine in ladles or a metal mixer, or be run into a basin of water whereby it is shotted. The latter method is especially desirable when this iron is to be recharged into a blast furnace.

Having thus described my invention, what I claim as new and useful and desire to secure by Letters Patent is:—

1. The process of manufacturing purified liquid iron which consists in collecting and retaining within a receptacle a bath of molten iron of such weight that the initial heat conserved is sufficient to keep the bath liquid throughout the entire process, then in subjecting the molten iron within the receptacle to the action of suitable metallic oxidizing agents, then facilitating the reaction between the molten iron and the slag formed by causing air in the form of one or more blasts to impinge upon the surface of the bath and then withdrawing the purified iron product in a liquid state.

2. The process of making purified liquid iron which consists in collecting and retaining within a receptacle a bath of molten iron in quantity sufficient to keep the bath liquid throughout the entire process without the aid of external heat by conserving and utilizing the initial heat of the molten iron, then in subjecting the molten iron to the action of suitable metallic oxids and fluxes, then accelerating the reaction between the molten metal and the slag formed by directing downwardly onto the surface of the bath a suitable blast of air and finally withdrawing the resultant product in a liquid state.

3. The process of making purified liquid iron which consists in collecting within a receptacle a bath of molten iron and blast furnace cinder, such iron being in quantity sufficient to keep the bath liquid throughout the entire process by conserving and utilizing the initial heat of the molten iron, then in subjecting the molten iron to the action of suitable metallic oxids and one or more air blasts directed downwardly onto its surface and finally running off the resultant product in a liquid state.

4. The process of making purified liquid iron which consists in collecting within a receptacle a bath of molten iron in quantity sufficient to keep the bath liquid throughout the entire process, then in simultaneously subjecting the molten iron to the action of suitable oxidizing agents and fluxes and one or more blasts of air directed downwardly onto its surface and then running off finished product in a liquid state.

5. The process of making purified liquid iron which consists in collecting and retaining within a receptacle a bath of molten iron in quantity sufficient to keep the bath liquid throughout the entire process without the aid of external heat by conserving and utilizing the initial heat of the molten iron, in running blast furnace cinder into the receptacle with the iron, then simultaneously subjecting the molten iron to the action of suitable oxidizing agents and an air blast directed downwardly onto the surface of the bath in such manner that a strongly oxidizing atmosphere is maintained at the point of contact of slag formed and the molten metal and finally running off finished product in a liquid state.

6. The process of making purified liquid iron low in phosphorus from iron high in phosphorus which consists in collecting and retaining within a receptacle a bath of molten iron high in phosphorus and in quantity sufficient to keep the bath liquid throughout the entire process by conserving and utilizing the initial heat of the molten iron, in subjecting the molten iron to the action of suitable metallic oxids and fluxes and sufficient air in the form of downwardly-directed blasts to facilitate and accelerate the reaction between the slag formed and the molten metal and then running off finished product in a liquid state.

7. The process of making purified iron, which consists in providing within a suitable receptacle a bath of super-molten iron in such quantity that it will remain liquid throughout the process by the heat conserved, in subjecting the molten iron to the action of suitable metallic oxids and fluxes, and in accelerating the reaction by the means of one or more blasts of air.

8. The process of making purified iron, which consists in collecting within a suitable receptacle a bath composed of blast furnace cinder and molten iron in such quantity that it will remain liquid throughout the process by the heat conserved, and in subjecting the bath to the action of suitable metallic oxids and one or more air-blasts.

9. The process of making purified liquid iron, which consists in collecting within a suitable receptacle a bath of molten iron in such quantity that it will remain liquid throughout the process by means of the heat conserved, in subjecting the molten iron to the action of suitable metallic oxids and fluxes, and in accelerating the reaction by maintaining a strongly oxidizing atmosphere at the point of contact of the slag formed and the molten metal by one or more air blasts.

10. The process of making purified liquid iron, which consists in collecting within a suitable receptacle a bath of molten iron in such quantity that it will remain liquid throughout the process by the heat conserved, and in simultaneously subjecting the molten iron to the action of suitable oxidizing agents and fluxes and one or more air-blasts.

11. The process of making purified liquid iron, which consists in collecting a bath of super-molten iron within a suitable receptacle in such quantity that it will remain liquid throughout the process by the heat conserved, in subjecting the bath to the action of suitable oxidizing agents and one or more air-blasts and then withdrawing finished product in a liquid state.

12. The process of making purified liquid iron, which consists in collecting a super-molten bath of iron in quantity sufficient to keep the bath liquid throughout the process by the heat conserved, in subjecting the bath to the action of suitable metallic oxids and fluxes, and in accelerating the reaction between the metal of the bath and the slag formed by means of an air-blast and then withdrawing resultant product in a liquid state.

13. The process of making purified liquid iron, which consists in collecting a super-molten bath of iron in quantity sufficient so that the bath is kept liquid throughout the process by the conservation of heat, in subjecting the bath to the action of suitable oxids and fluxes, in accelerating the reaction between the slag formed and the metal of the bath by maintaining a strongly oxidizing atmosphere at the point of contact of the slag and the molten metal by means of one or more air-blasts, and then running off finished product in a liquid state.

14. The process of making purified liquid iron, which consists in collecting a bath of super-molten iron and blast furnace cinder in quantity sufficient to keep the bath liquid throughout the process by the heat conserved, and in simultaneously subjecting the bath to the action of suitable oxidizing agents and one or more air-blasts, and then running off finished product in a liquid state.

In testimony whereof I have hereunto subscribed my name this 14th day of November, 1904.

HERMAN A. BRASSERT.

Witnesses:
   JNO. S. GREEN,
   E. D. NUGENT.